United States Patent [19]

Sukup

[11] E Patent Number: Re. 33,358

[45] Reissued Date of Patent: Oct. 2, 1990

[54] DRYING BIN FLOOR

[76] Inventor: Eugene G. Sukup, Beeds Lake, Hampton, Iowa 50441

[21] Appl. No.: 231,222

[22] Filed: Aug. 11, 1988

Related U.S. Patent Documents

Reissue of:

[64] Patent No.: 4,604,842
Issued: Aug. 12, 1986
Appl. No.: 706,489
Filed: Feb. 28, 1985

[51] Int. Cl.[5] ..... E04B 1/70

[52] U.S. Cl. ..... 52/263; 52/192; 52/303; 52/588; 52/748

[58] Field of Search ..... 52/536, 145, 588, 508, 52/192, 303, 748; 404/41, 36; 98/53; 34/233, 237, 238

[56] References Cited

U.S. PATENT DOCUMENTS

| | | | |
|---|---|---|---|
| D. 183,574 | 9/1958 | Liskey | 52/180 |
| 2,397,940 | 4/1946 | Benham | 52/542 |
| 2,901,960 | 9/1959 | Barre et al. . | |
| 3,324,616 | 6/1967 | Brown | 52/588 |
| 3,336,705 | 8/1967 | Vecchiarelli et al. . | |
| 3,643,607 | 2/1972 | MacKenzie | 52/588 |
| 3,675,379 | 7/1972 | Lambert | 52/588 |
| 3,875,714 | 4/1975 | Nayler et al. . | |
| 4,009,520 | 3/1977 | Sukup . | |
| 4,073,110 | 2/1978 | Kennedy | 52/303 |
| 4,137,682 | 2/1979 | Trumper | 52/588 |
| 4,282,694 | 8/1981 | Mead . | |

FOREIGN PATENT DOCUMENTS

| | | | |
|---|---|---|---|
| 2366418 | 9/1976 | France | 52/180 |

OTHER PUBLICATIONS

Advertising literature entitled "Channel-Lok Floors—-Floor Support Systems" of S&H Mfg. Inc. of Napanee, Ind.

*Primary Examiner*—John E. Murtagh
*Attorney, Agent, or Firm*—Neuman, Williams, Anderson & Olson

[57] ABSTRACT

A supported floor for use in a grain storage and/or drying bin is disclosed that is constructed of interlocking perforated flooring or panels of two designs each with a plank portion and subjacent flanges which alternate with each other. The first panel design has flanges which are outwardly turned to form a hat-shaped transverse cross section. The second panel design has channels which are inwardly turned resulting in a C-shaped transverse cross section. To assemble the supported floor, the hat-shaped panels are rested on supports which are arranged on the base of the bin in a predetermined manner. These supported hat-shaped panels are positioned in spaced relation to one another so that a C-shaped panel can be fit between each adjacent pair of the hat-shaped panels. Thereafter, the C-chaped panels are positioned in the respective spaces and interlocked with the hat-shaped panels. To gain access to the bin floor, any of the C-shaped floor panels can be lifted without affecting the hat-shaped panels.

29 Claims, 2 Drawing Sheets

FIG. 1
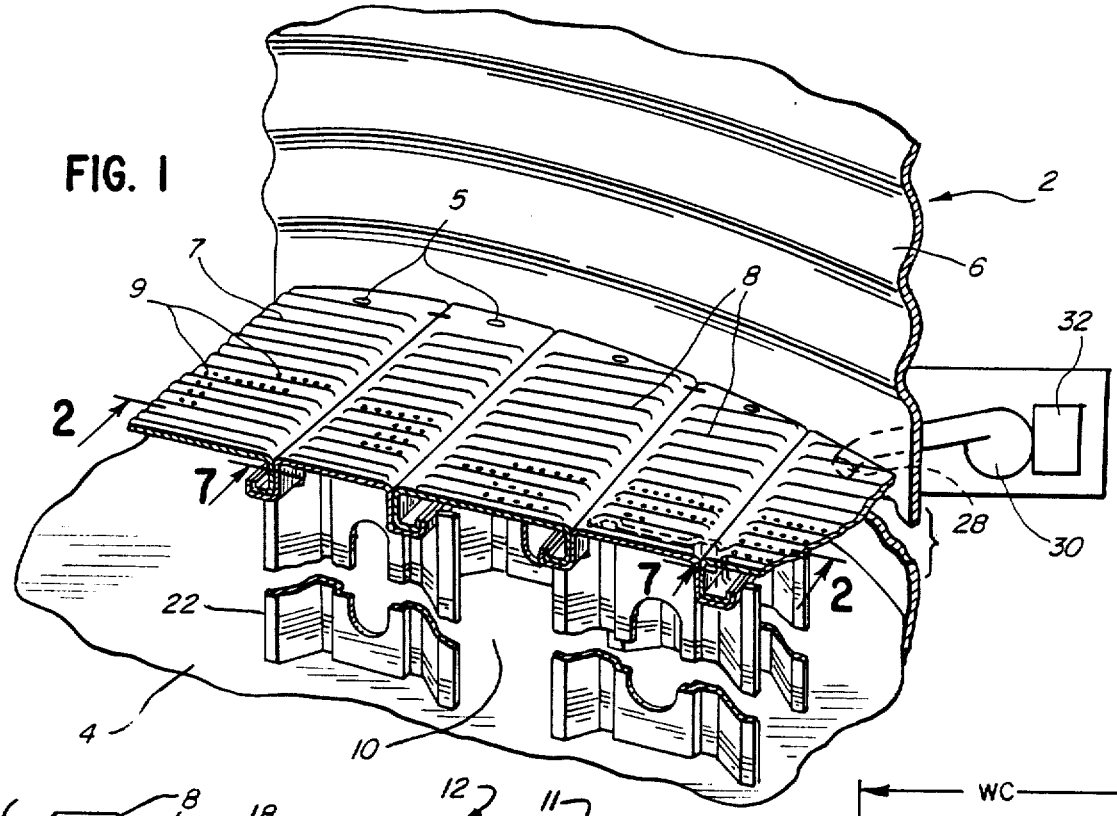
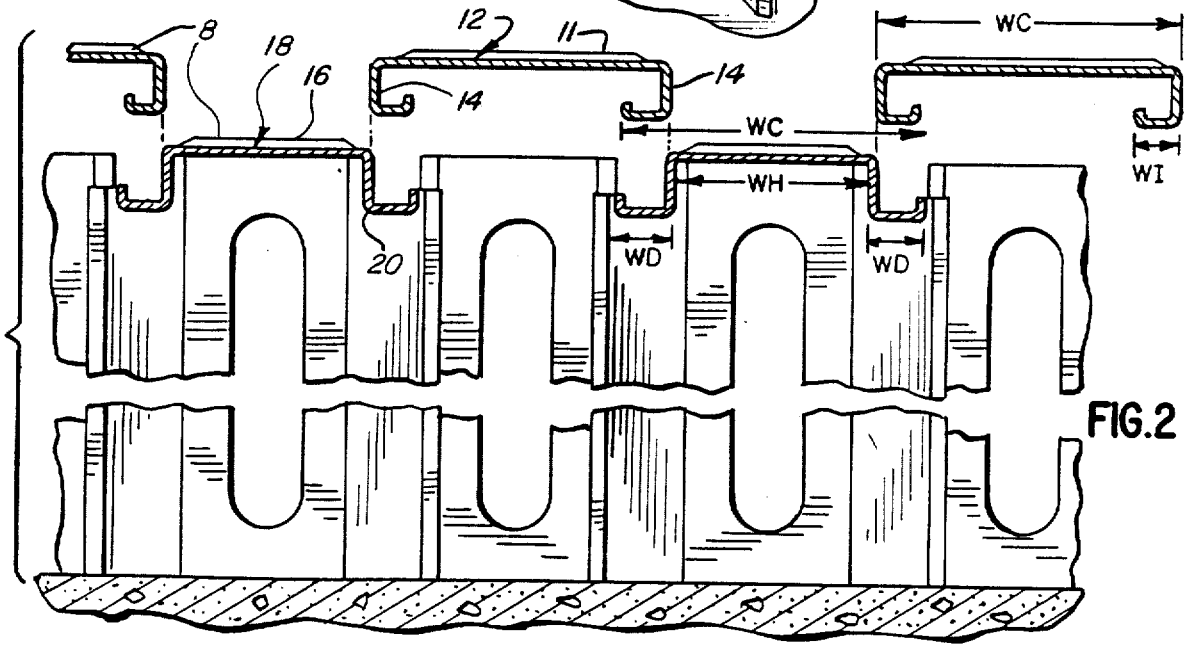
FIG.2
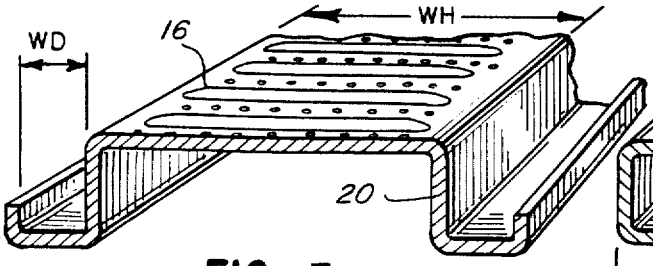
FIG. 3
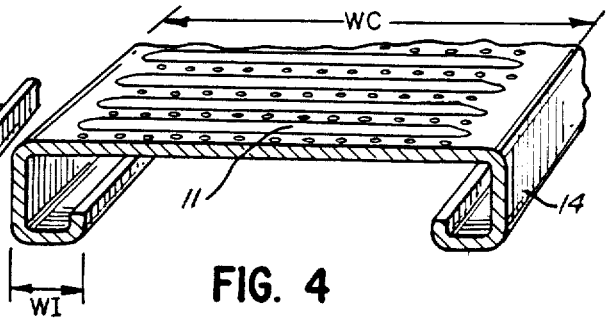
FIG. 4

DRYING BIN FLOOR

Matter enclosed in heavy brackets [ ] appears in the original patent but forms no part of this reissue specification; matter printed in italics indicates the additions made by reissue.

BACKGROUND OF THE INVENTION

Field of the Invention

This invention relates to supported bin floors and particularly to formed sheet metal perforate panel floors such as are used for false floors above plenums in grain bins.

Floors which are used in grain storage bins are oftentimes elevated and supported above a base of the bin thereby creating a plenum between the base and the supported floor. The supported floor has perforations through it so that air which may be heated or ambient, can be passed from outside the bin into the plenum and up through the perforations in the floor for passage through overlying grain. The air may be used to dry, cool or otherwise condition overlying grain in the bin, e.g. to prevent subsequent spoilage of the grain. Such bins may serve as drying bins for continuous or batch drying and/or for longer term storage.

Supported bin floors generally include a plurality of longitudinal panels cut to appropriate lengths and arranged side-by-side to substantially cover the entire floor area of the bin, e.g., as shown in U.S. Pat. No. 4,009,520. In a common current commercial design of these panels illustrated in FIGS. 6A and 6B hereof and as sold under the trademark CHANNEL LOK by S & H Manufacturing Co., one variant of which is disclosed in U.S. Pat. No. 4,073,110, a plurality of similar floor panel sections each have male and female flanges of U-shaped cross sections along opposite edges of the panel so that the male flange of one panel section can be positioned in and interlocked with the female flange of an adjacent floor panel section. Floor supports, e.g., as in FIG. 8 hereof, are distributed throughout the plenum. These supports subtend the panels and often engage the outside of the female flanges. In one embodiment, as shown in U.S. Pat. No. 4,073,110, the supports used have outwardly diverging sides with recesses cut into the upper end of both sides so that the engaged flanges can be received therein. Another form of available support is shown in FIG. 8 of the drawings hereof. Other forms of supports are also available, including blocks placed on the base of the bin and on to which are placed the engaged flanges of the floor sections.

One key problem with the existing supported perforate floors in grain bins is that fine materials such as chaff, broken kernels and the like in the grain being stored and/or dried tend to sift through the perforations in these floors with successive uses and collect in the plenum. Such sifting and filling is accelerated in bins which use bottom unloading augers for continuous drying. These augers continuously stir, move or "work" the grain near the supported floor, and incidentally enhance the sifting action. This can result in substantially filling the plenum with fines over a relatively short period, e.g., in as little as one season of use with the floors as described above. The accumulation of fines obviously interferes with the airflow desired.

Procedures for attempting to clean out the plenum without removing the floor having generally proven unsatisfactory. For example, attempts to clean the plenum by reversing airflow in the bin or by opening portholes in the side walls corresponding to the plenum of the bin and extending lances or suction hoses into the plenum generally have proven unsatisfactory. This may be due, at least in part, to the tendency of moisture to accumulate in this fine material and cause compaction or "caking" as well as to the physical difficulty of reaching from the side portholes to all areas within the plenum, which is usually of a substantial diameter and has throughout that area many support posts.

With the conventional floors of similar panels which are progressively interlocked, typically it is necessary to disassemble and remove the entire floor to gain adequate access for cleaning or otherwise working in the entire area of the plenum around the many supports. Such process is time consuming and expensive.

It is highly desirable to provide a supported grain bin floor which can be partially removed selectively in various areas of the bin to gain direct access to the underlying space and components without disturbing the basic floor assembly, e.g., for removing any foreign material accumulated in a plenum or other space thereunder. It is also highly desirable to provide a supported grain floor which includes interlocked floor panels or sections which can be individually replaced or removed without distributing the adjacent panels. It is further desirable to provide such a supported floor which can be supported with conventional posts subtending the panels and having recesses to engage the channel flanges and stabilize the floor. It is also desirable to provide such a supported floor that can be easily assembled, disassembled and efficiently stored and transported.

It is an object of this invention to provide a supported grain bin floor which will satisfy the aforenoted requirements and meet the particular needs for perforated floors in grain storage bins.

It is another object of this invention to provide a supported grain bin floor which can be partially disassembled to gain access to the underlying space and any material accumulated therein.

It is another object of this invention to provide a supported grain bin floor having panel sections which can be selectively removed from any area of the floor for maintenance or replacement purposes.

It is yet another object of this invention to provide a supported grain bin floor as aforenoted and which includes interlocked panel sections that can be engaged by support posts of uniform configuration to stabilize the resulting elevated floor and maintain it in its designed state.

Further and additional objects of this invention will appear from the following description, accompanying drawings and appended claims.

SUMMARY OF THE INVENTION

In accordance with a preferred embodiment of this invention in use in a grain storage and/or drying bin, the aforementioned requirements and objects are satisfied through a supported floor that is constructed of interlocking perforated flooring or panels of two designs which alternate with each other. Both designs have a plank portion and subjacent flanges or channels which run along each longitudinal edge. In the first panel design, both channels are out-turned from the plank portion resulting in a hat-shaped transverse cross-section. In the second panel design, both channels are inturned resulting in a C-shaped transverse cross-section.

To assemble the supported floor, the hat-shaped panels with out-turned channels are rested on supports which are arranged on the base of the bin in a predetermined manner. These supported hat-shaped panels are positioned in space relation to one another so that a C-shaped panel with inwardly turned locking channels can be fit between each adjacent pair of the hat-shaped panels. The supports which will subtend the C-shaped panels span these spaces and engage the adjacent flanges of the adjacent hat-shaped panels; these supports being placed as the later panels are placed in the assembly. Thereafter, the C-shaped panels are positioned in the respective spaces and interlocked with the hat-shaped panels. Once the flooring is supported, it is ready to support grain on this surface and to permit the passage of air from outside the bin into the plenum and up through the perforations in the floor in a normal manner. For maintenance purposes, the bin can be emptied of grain and any of the C-shaped floor panels can be lifted from between adjacent hat-shaped panels so that direct access can be gained to the space beneath the area where the C-shaped panel was located and under the adjacent hat-shaped panels which remain in place. The supports for subtending the C-shaped channels also remain in place. If it is necessary to remove a hat-shaped panel from any part of the bin or to move or remove a support post, the two C-shaped panels adjacent the subject hat-shaped panel can be removed and the subject hat-shaped panel can then be readily lifted and the corresponding support posts rearranged or removed.

DESCRIPTION OF THE DRAWINGS

For a more complete understanding of this invention, reference should be made to the embodiment illustrated in greater detail in the accompanying drawings and described below by way of example of the invention.

FIG. 1 is a schematic partial perspective view of a supported floor located in a grain bin and embodying teachings of this invention;

FIG. 2 is an exploded partial sectional view as taken along line 2—2 of FIG. 1;

FIG. 3 is a partial sectional perspective view of a hat-shaped panel of FIG. 1, with outwardly turned channels or flanges;

FIG. 4 is a partial sectional perspective view of a C-shaped panel of FIG. 1, with inwardly turned channels or flanges;

Figure 5:
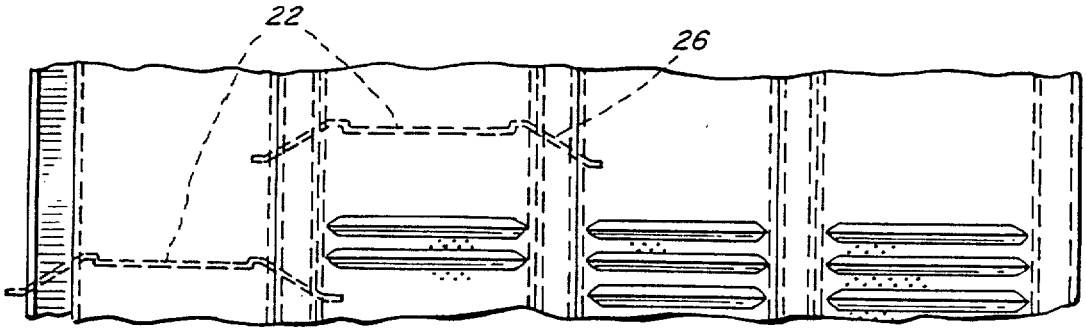
FIG. 5 is a partial top view of the floor shown in FIG. 1 (phantom lines show the subjacent channels and the respective supports)

It should be understood that the drawings are not necessarily to scale and that an embodiment is sometimes illustrated in part by phantom lines and fragmentary views. In certain instances, details of the actual structure which are not necessary for the understanding of the present invention may have been omitted. It should be understood, of course, that the invention is not necessarily limited to the particular embodiments illustrated herein.

DETAILED DESCRIPTION

FIG. 1 illustrates a partial perspective view of a grain bin 2 having a concrete base floor 4 and a circular wall 6, typically formed of corrugated sheet metal, with the supported grain bin floor system 7 also typically formed of sheet metal and which is the subject of this invention. The supported floor system 7 includes two designs of panels 8 each having perforations 9 (punch-perforated or slit-perforated) to provide for the passage of conditioning air, e.g., drying and/or cooling air. This air is conveyed into the bin by a fan 30, which may include a heater 32 located outside the bin, and enters the bin through a port-hole 28. The air passes into the plenum 10 below the panels 8 and up through the perforations into and through grain (not shown) stored in the bin on the supported floor system 7. A gripping notch or opening 5 is formed near the end of each panel 8 for engagement by a gripping tool or means (not shown) to align or lift a desired panel 8. Such openings are either small enough to prevent leakage of grain therethrough, or may be provided with readily removable covers.

FIG. 2 shows an exploded sectional front view of the supported floor system 7 taken along line 2—2 of FIG. 1. In this illustration the two designs of panels 8 are shown, that is, the C-shaped panel 11 with a central panel plank portion 12 and uniform inwardly turned channels or flanges 14 running longitudinally along the opposite sides of the plank portion 12, and the hat-shaped panel 16 with a central panel plank portion 18 and uniform outwardly turned channels or flanges 20 running longitudinally along the opposite sides of the plank portion 18. A partial perspective view of a hat-shaped panel 16 is shown in FIG. 3 and a partial perspective view of a C-shaped panel 11 is shown in FIG. 4.

The inwardly turned flanges 14 of the C-shaped panel 11 are designed to be fit into the outwardly turned channels 20 of the hat-shaped panels 16. To accomplish this, the outside width WI of each inwardly turned channel 14 is somewhat less than the outside width WO of each outwardly turned channel 20, i.e., by about twice the thickness of the sheet material (typically sheet metal) from which the panels are formed, so that when a channel 14 of a C-shaped panel is placed over a channel 20 of an adjacent hat-shaped panel, the adjacent panels can be interlocked and thereby snuggly held together as shown in FIG. 1. As will be seen, the interlocking channels 14 and 20 are beneath the planes of the central plank portions. The plank portions of adjacent panels abut one another to form a continuous, essentially planar floor surface. The channels effectively form support beams.

It should be understood that other configurations of channels or flanges could be used to accomplish the same purposes of this invention. For instance, rounded J-shaped inwardly turned channels on panels 11 can be nested with corresponding J-shaped outwardly turned channels of hat-shaped panels 16.

As shown in FIGS. 1, 2, 7, and 8, a floor support 22 with a central panel portion 23 and diverging sides 24 has a recess 26 (shown by phantom lines in FIG. 1) in the top portion of each of its diverging sides 24 to accommodate the outwardly turned channels 20 of the hat-shaped panels. These supports 22 always engage the outer channel of each nested pair of channels, that is the outwardly turned channels 20 of the nesting pairs 14 and 20 of channels. The top segment 23a of the central panel portion extends upward between the respective adjacent pair of the channels to provide direct support for the respective plank portion 12 or 18. Of course it should be understood that for J-shaped flanges, the recesses in the supports would be designed to accommodate such a shape.

With the dual designed panels 8 of the present invention, a continuous planar floor is formed with each panel being supported by the support members. Any of the C-shaped panels 11 may be removed whenever the floor is clear simply by lifting the selected panel from its normal position; see FIGS. 2 and 7. Each of the panels 11 and 16 may be of any desired width. Though as pointed out further below, a specific width relationship is preferred. In other than that preferred relationship, the supports beneath the respective panels would be of appropriate corresponding dimensions if used to span the channels of both types. Use of supports to span the panels of both types is desirable as the supports spanning the C-shaped panels 11 assist in maintaining the desired spacing of the adjacent hat-shaped panels 16 and the overall integrity of the floor system while one or more panels 11 are removed. By choosing the preferred width relationship, it is possible to use supports 22 of uniform width to span both the C-shaped panels 11 and the hat-shaped panels 16. This is shown in FIGS. 2 and 5 with standard supports 22 underlying both the hat-shaped panels 16 and the C-shaped panels 11. Thus, this invention permits the use of standard supports which will span panels of both designs.

However, it should be noted that specific widths of the panels to maintain a uniform effective width of both panels is not essential to accomplish the ready removability of the panels 11. Rather, these variations are used so that uniform floor supports can be used with this invention.

Figure 7:
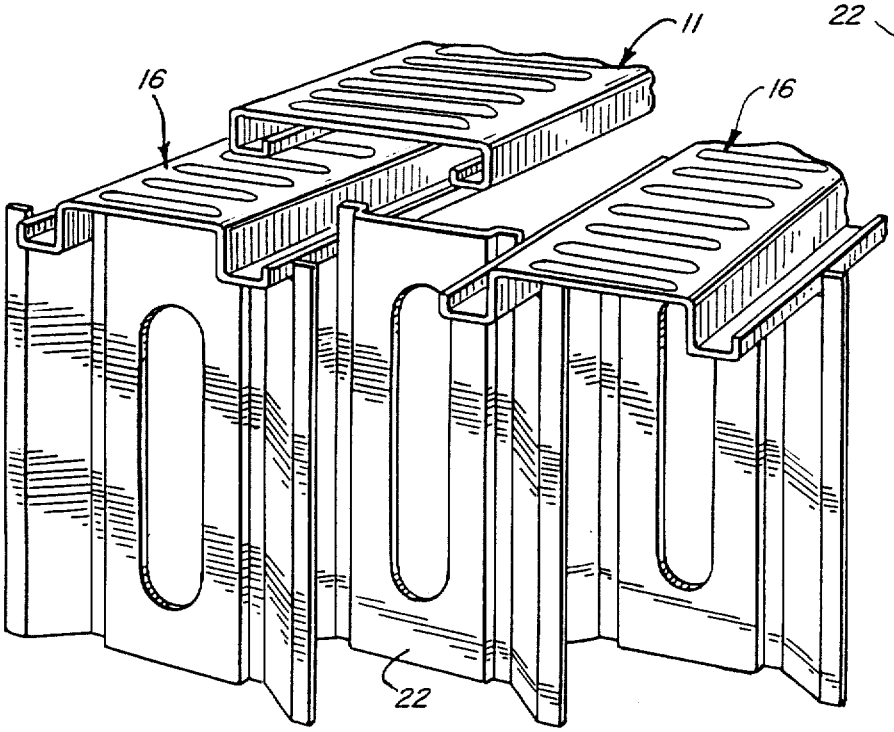
FIG. 7 shows a perspective exploded view of part of the floor of FIG. 1 taken along line 7—7 of FIG. 1.
Figure 8:
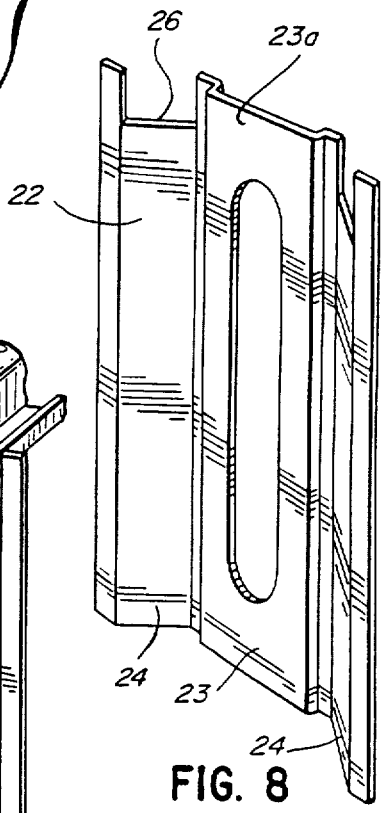
FIG. 8 is a perspective view of a support post of the assembly in FIG. 1.

The floor support system 7 of this invention can be readily assembly by placing a number of support posts 22 on the concrete base floor 4 of the portion of the bin 2 where the panels 8 are to be assembled. In general, the supports span below both designs of the panels 11, 16 to provide bearing support across the plank portions 12, 18 of each panel to prevent sagging of the plank portions. As best shown in FIGS. 5 and 7, these supports 22 are staggered along the lengths of adjacent alternating panels 11, 16 and typically are spaced about 36 inches from one another along the length of each panel. When a plurality of aligned supports 22 have been positioned on the base floor, a hat-shaped panel 16 is placed into the two recesses 26 of each such aligned support. After two adjacent, appropriately spaced hat-shaped panels 16 are in place and supported, a C-shaped panel 11 can be positioned and placed therebetween as shown in FIG. 7. The appropriate spacing is assured by the use of supports 22 of appropriate width spanning between the adjacent panels 16 and engaging the respective adjacent channels 20. A slight amount of pressure may be necessary to seat a panel 11 and make the adjacent plank portions flush with each other depending upon the tightness of the fit of the interlocked panels. Once a set of the panels are in place, additional supports can be set up and corresponding panels positioned accordingly until the desired floor system with alternating reverse panels 8 is fully assembled after which storage and conditioning of grain may be initiated.

With the applicant's invention, access to the space beneath the floor, e.g. for removal of accumulated fines, can be readily accomplished by lifting any selected C-shaped panel(s). The openings 5 in the panels 8 facilitate gripping of the panels for positioning and removal, most notably for removing panels 11 from a completed assembly. Each lifted panel can be placed on another portion of the supported floor or removed completely from the bin. With direct access to the portion of the plenum beneath the displaced panel, the underlying fines can then be removed or other operations performed therein. Access can also be easily gained underneath the adjacent hat-shaped panels, as is apparent in FIG. 7.

Because the supports engage only the hat-shaped panels, the floor remains stable and the spacing between the adjacent hat-shaped panels is maintained while the C-shaped panels are lifted to gain access to the plenum. The removed or lifted C-shaped panel can be easily replaced. Moreover, the supports in the space of a removed C-shaped panel also can be removed by lifting slightly or tilting the adjacent hat-shaped panels to free the intervening supports. If necessary, any hat-shaped panel can be lifted and the underlying supports can be removed by removing both adjacent C-shaped panels. Other methods of removing the C-shaped and hat-shaped panels or underlying supports can be used depending upon the particular components desired to be lifted or removed. The applicant has described the above methods in an effort to disclose a preferred mode of gaining access to the plenum beneath the applicant's flooring system with alternating panels.

As discussed above, in the preferred embodiment of this invention, it is possible to use standard floor support posts 22 which have a uniform pre-determined distance between recesses 26 to span and support both the C-shaped panels 11 and the hat-shaped panels 16. To accomplish this, it is necessary that the width WC of the C-shaped plank portion 12 (FIGS. 4 and 5) be greater than the width WH of the hat-shaped panel plank portion by about twice the outside-dimension WI of the inwardly turned channels 14. The aforedescribed preferred dimensional relationship of the two panel plank portions may be stated by the formula $WC=WH+2WI$. It will also be observed that the panels 11 and 16 are of substantially the same overall width, with allowance for the thickness of the panel sheet material. This relationship results in uniform spacing of adjacent nesting channels when the panels 11 and 16 are assembled in alternating array as illustrated in FIGS. 1, 2 and 5, as well as providing substantially uniform clearance between these channels beneath both of the central plank portions 12 and 18. These uniform spacings and clearances permit the use of supports 22 of uniform design and dimension throughout a floor system, beneath both types of panels 11, 16 despite the differences in the designs of those panels.

Figure 6A:
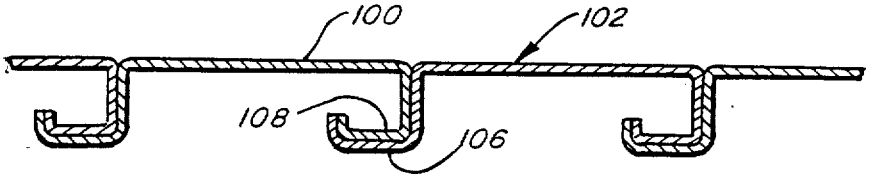
FIG. 6A PRIOR ART
FIG. 6A shows a partial front sectional view of interlocked prior art floor panels.
Figure 6B:
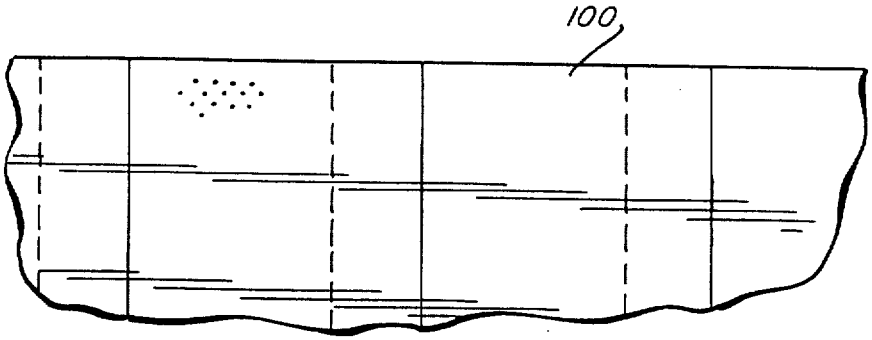
FIG. 6B PRIOR ART
FIG. 6B shows a partial top sectional view of the interlocked prior art floor panels shown in 6A.

Further, by selecting an appropriate value for WC and corresponding value for WH as described for the preferred embodiment, and appropriately dimensioned channels, supports 22 may be of the same design and dimensions, and therefore the same supports, as are often used to support floors constructed of standard prior art panels 100 as shown in FIGS. 6A and 6B. These prior art panels 100 have a plank portion 102 and two subtending channels, one outwardly turned as at 106 and the other inwardly turned as at 108. Successive panels of this type are assembled and interlocked by placing the inwardly turned channel 108 of each panel 100 into the outwardly turned channel 106 of a preceding panel e.g., by placing the channel 108 of one panel 100 as shown in FIG. 6A in channel 106 of a preceding panel and so on, progressing across the floor. Because the design of the prior art panels 100 are uniform, the width of the plank portions does not vary. Correspondingly, the spacing of adjacent internesting channels remains constant throughout the floor and inherently accommodates uniform supports such as the support 22 shown in FIG. 8. The standard support posts 22 positioned below the prior art panels 100 engage successive panels at their respective outwardly turned channels 106 and/or directly engage the plank portions 102 therebetween. However, as noted above, the prior art floors of FIGS. 6A and 6B did not permit selective removal of panels [or] *as* in the floor of FIGS. 1–5, 7 and 8. The preferred embodiment of the unique floor of this invention permits the use of standard posts throughout while gaining the selective removability provided by this invention.

Thus a drying bin floor with alternating reverse panels and a manner of assembly and selective disassembly and a method of gaining access to the plenum beneath the supported floor have been provided which meet the aforestated object of this invention.

While a specific embodiment of the invention has been shown, it will be understood, of course, that the invention is not limited thereto since modifications may be made and other embodiments of the principles of this invention will occur to those skilled in the art to which this invention pertains. Therefore, it is contemplated by the appended claims to cover any such modifications and other embodiments as incorporate those features of this invention within the true spirit and scope of the following claims.

What is claimed is:

1. A perforate grain bin floor assembly for a supported floor having a space therebeneath comprising a series of elongated panels of formed sheet material, each of said panels having a generally planar top portion and depending flanges along each longitudinal edge of said top portion, said top portions of successive panels in said series being perforate to permit the passage of air therethrough and being contiguous to one another along said longitudinal edges of said top portions, each of said flanges of alternate panels in said series extending downward and outward from the respective edge of the top portion thereof, each of said flanges of each of said panels which intervenes between said alternate panels extending downward and inward from the respective edge of the top portion of such intervening panel and engaging in nesting relation with the respective adjacent flange of the adjacent alternate panel, whereby said top portions form a generally continuous planar floor surface while permitting the passage of air therethrough, and each of said intervening panels may be selectively lifted from said assembly for access to the space subjacent said panels.

2. The invention of claim 1 wherein said flanges of alternate panels are interlocked with said flanges of said intervening panels.

3. The invention of claim 1 wherein said depending flanges are U-shaped in cross-section.

4. The invention of claim 1 further comprising a plurality of support posts each having a top portion subtending one of said planar top portions of said panels and engaging the adjacent nested flanges.

5. The invention of claim 4 wherein each of said support posts engages opposite sides of each of said nested flanges.

6. The invention of claim 4 wherein some of said support posts span each of said intervening panels and engage the adjacent flanges of the respective adjacent alternate panels whereby predetermined spacing is established and maintained between said alternate panels.

7. The invention of claim 4, 5 or 6 wherein said support posts span each of said panels in supporting relation with the planar top portions of said panels between said nested flanges.

8. The invention of claim 1, 2, 3, 4, 5 or 6 wherein the distance between the opposing flanges of each of said alternate panels is substantially equal to the distance between the opposing flanges of each of said intervening panels.

9. The invention of claim 1, 2, 3, 4, 5 or 6 wherein the width of said alternate panels is substantially equal to the width of said intervening panels.

10. In a bin for storing or drying grain and having a base floor, a supported floor assembly comprising the combination of a plurality of [support posts] *supports* each having a bottom portion positioned on said base floor and each having a top portion spaced from said base floor, [a plurality of hat-shaped] *first and second* panels each having a panel plank portion which is perforate for the passage of air therethrough and [has] *each having* two longitudinal edges, and each of said [hat-shaped] *first and second* panels having an outwardly turned depending channel subjacent to [each] *at least one* of said longitudinal edges, and at least one C-shaped panel having a panel plank portion which is perforate for the passage of air therethrough and has two longitudinal edges, and said C-shaped panel having an inwardly turned depending channel subjacent to each of said longitudinal edges thereof, said outwardly turned channels of each [hat-shaped panel] *of said first and second panels* contacting the top portion of [a plurality of] said [support posts] *supports and extending toward and spaced from one another,* said C-shaped panel being positioned between [a] *said* first and [a] second [of said hat-shaped] panels and having one of said inwardly turned channels thereof in interfitting relation with [an] *said* outwardly turned channel of said first [hat-shaped] panel and the other of said inwardly turned channels thereof in interfitting relation with [an] *said* outwardly turned channel of said second [hat-shaped] panel, and said panel plank portions being contiguous to one another along said longitudinal edges of said panel plank portions, whereby said panels form a generally continuous planar floor surface permitting passage of air therethrough for conditioning grain and said C-shaped panel can be lifted to gain access to the space between said panels and said base floor.

11. The combination as in claim 10 wherein said panel plank portion and the respective [two] subjacent channels of each of said panels are integral with each other and formed such that the width of said C-shaped panel is substantially the same as the width of the [hat-shaped panel] *first and second panels.*

12. The combination as in claim 10 including such [support posts] *supports* spanning each of said C-shaped panels and engaging said outwardly turned channels of the respective adjacent [two said hat-shaped] *first and second* panels.

13. The combination as in claim 10 [or 12], *12, 20 or 21* including such [support posts] *supports* spanning each of said [hat-shaped] *first and second* panels and engaging said outwardly turned channels of such [hat-shaped] *first and second* panels.

14. The combination as in claim 10 wherein said C-shaped panel plank portions have gripping means for lifting and positioning said C-shaped panels.

15. A perforate false floor assembly in a bin for storing or drying grain and having a base floor, said false floor assembly comprising the combination of a plurality of support posts each having a bottom portion positioned on said base floor and a top portion spaced from said base floor, a plurality of hat-shaped panels arranged parallel and in spaced relation to one another and each having a panel plank portion which is perforate to permit the passage of air therethrough and has two longitudinal edges, and each of said hat-shaped panels having an outwardly turned channel subjacent to each of said longitudinal edges, and a plurality of C-shaped panels each having a panel plank portion which is perforate to permit the passage of air therethrough and has two longitudinal edges, and each of said C-shaped panels having an inwardly turned channel subjacent to each of said longitudinal edges thereof, said outwardly turned channels of each hat-shaped panel contacting the top portion of a plurality of said support posts, one of said C-shaped panels being positioned between each adjacent two of said hat-shaped panels and having one of said inwardly turned channels thereof in interfitting relation with an outwardly turned channel of one of the respective adjacent two hat-shaped panels and the other of said inwardly turned channels thereof in interfitting relation with an outwardly turned channel of the other of said two adjacent hat-shaped panels such that said panel plank portions are contiguous to one another along said longitudinal edges of said panel plank portions, whereby said panels form a generally continuous planar floor surface permitting passage of air therethrough for conditioning grain and said C-shaped panels can be lifted to gain access to the space between said panels and said base floor.

16. A method of constructing a supported perforate grain bin floor with [alternating reverse panels] *at least one removable panel* in a grain bin having a base floor comprising:

positioning a plurality of [support posts] *supports* in a pre-determined manner on the base floor of the bin;

providing at least two [hat-shaped] *first* panels each having a panel plank portion which is perforate to permit the passage of air therethrough and has two longitudinal edges, and each of said panels having an outwardly turned edge channel subjacent to [each] *at least one* of said longitudinal edges;

positioning said [hat-shaped] *two* panels over said [support posts] *supports* and in substantially parallel relationship to each other and spaced at a predetermined distance from each other *with said channels extending toward one another;* providing a C-shaped panel having a panel plank portion which is perforate to permit the passage of air therethrough and has two longitudinal edges, and said panel having an inwardly turned channel subjacent to each of said longitudinal edges; and positioning said C-shaped panel between *said* two [such spaced hat-shaped] *first* panels and interfitting one of said inwardly turned channels of said C-shaped panel into the adjacent outward turned channel of one of said two [hat-shaped] *first* panels and the second of said inwardly turned channels of said C-shaped panel into the adjacent outwardly turned channel of the other of said two [hat-shaped] *first* panels with said panel plank portions contiguous to one another along said longitudinal edges of said panel plank portions thereof, whereby said panel plank portions form a generally continuous planar floor surface permitting the passage of air therethrough for conditioning grain and said C-shaped panel can be lifted to gain access to the space subjacent said bin floor without lifting either of [the hat-shaped] *said two first* panels.

17. A method as in claim 16 further comprising:

positioning a plurality of said [support posts] *supports* in a predetermined manner on the base of the bin between two such spaced [hat-shaped panel] *first panels;* engaging one outwardly turned edge channel [a] *of one of said* first [hat-shaped panel] *panels* and the opposing outwardly turned channel of [a second hat-shaped panel] *the other of said first panels* with said [support posts] *supports;* positioning a C-shaped panel between said first [and second hat-shaped] panels; and interfitting each of said inwardly turned channels of said C-shaped panel into said engaged outwardly turned channels of said [hat-shaped] *first* panels, whereby said C-shaped panel can be lifted to gain access to the space subjacent said bin floor without lifting either of the [hat-shaped] *first* panels or altering the position of any of said [support posts] *supports.*

18. A method of removing accumulated fines from the base of a grain bin having a supported floor with alternating C-shaped panels and hat-shaped panels comprising:

lifting selected C-shaped panels; and removing said fines from the portion of the base subjacent each such lifted C-shaped panel without removing the respective adjacent hat-shaped panels.

19. In a bin for storing or drying grain and having a base floor, a supported floor assembly comprising a combination of a plurality of support posts each having a bottom portion positioned on said base floor and each having a top portion spaced from said base floor and a perforate floor assembly supported on said posts, the improvement wherein said perforate floor assembly is a floor assembly as in claim 1.

*20. The invention of claim 10 wherein each of said first and second panels includes a depending channel subjacent each of its longitudinal edges.*

*21. The invention of claim 10 wherein each of said first and second panels is hat-shaped having an outwardly turned depending channel subjacent to each of its longitudinal edges.*

*22. The invention of claim 10 wherein each of said supports is a post.*

*23. The invention of claim 10, 20, or 21 wherein each of said supports is a post and said outwardly turned channels of each of said first and second panels contacts the top portion of a plurality of said support posts.*

*24. A method of constructing a supported perforate grain bin floor with alternating reverse panels comprising the method of claim 20 wherein said first panels are hat-shaped having an outwardly turned edge channel subjacent to each of said longitudinal edges, including successively positioning such hat-shaped panels in spaced relation to one*

*another and positioning such a C-shaped panel with its inwardly turned channels in interfitting relation with the outwardly turned channels of each adjacent pair of said hat-shaped panels, whereby a continuous planar floor surface is provided and any of said C-shaped panels can be lifted to gain access to the space subjacent said bin floor without lifting any of said hat-shaped panels.*

*25. A perforate grain bin floor assembly for a supported floor having a space therebeneath comprising a series of elongated panels of formed sheet material, each of said panels having a generally planar top portion and depending flanges along each longitudinal edge of said top portion, said top portions of successive panels in said series being perforate to permit the passage of air therethrough and being disposed contiguous to one another along said longitudinal edges of said top portions, said depending flanges of said panels along each said pair of contiguous edges being engaged in interlocking relation with one another, said series of panels comprising at least one symmetrical panel within said series wherein both of said flanges thereof extend inwardly or outwardly of said symmetrical panel and two other panels of said series, which are disposed along opposite sides of said symmetrical panel with the longitudinal edges of their top portions contiguous to said longitudinal edges of said top portion of said symmetrical panel, each have one of said depending flanges thereof engaged in interfitting relation with one of said flanges of said symmetrical panel in the same manner as the other and each of said two other panels extend outwardly from said symmetrical panel, one of said interfitting flanges at each of said contiguous edges between said symmetrical panel and said two other panels extending outwardly of the panel top portion from which it depends and the flange which interfits therewith extending inwardly of the panel top portion from which it depends.*

*26. The invention of claim 25 wherein said symmetrical panel is hat-shaped, said depending flanges thereof being outwardly turned relative to said top portion thereof.*

*27. The invention of claim 26 wherein said two other panels are C-shaped, said depending flanges thereof being inwardly turned relative to said top portion thereof.*

*28. The invention of claim 25 wherein said symmetrical panel is C-shaped, said depending flanges thereof being inwardly turned relative to said top portion thereof.*

*29. The invention of claim 28 wherein said two other panels are hat-shaped, said depending flanges thereof being outwardly turned relative to said top portion thereof.*

* * * * *